(12) United States Patent
Okawa

(10) Patent No.: US 10,858,552 B2
(45) Date of Patent: Dec. 8, 2020

(54) MASKING PRESSURE-SENSITIVE ADHESIVE TAPE

(71) Applicant: NITTO DENKO CORPORATION, Ibaraki-shi, Osaka (JP)

(72) Inventor: Yuji Okawa, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 150 days.

(21) Appl. No.: 15/147,044

(22) Filed: May 5, 2016

(65) Prior Publication Data

US 2016/0355703 A1 Dec. 8, 2016

(30) Foreign Application Priority Data

Jun. 3, 2015 (JP) ................. 2015-112963

(51) Int. Cl.
*C09J 133/06* (2006.01)
*C09J 133/02* (2006.01)
(Continued)

(52) U.S. Cl.
CPC ........ *C09J 133/068* (2013.01); *C09D 183/08* (2013.01); *C09J 7/38* (2018.01); *C09J 133/02* (2013.01); *C08G 77/28* (2013.01); *C08L 2312/00* (2013.01); *C09J 133/08* (2013.01); *C09J 183/04* (2013.01);
(Continued)

(58) Field of Classification Search
CPC ......... C09J 133/068; C09J 7/38; C09J 133/02
See application file for complete search history.

(56) References Cited

U.S. PATENT DOCUMENTS

| 4,039,707 A | * | 8/1977 | O'Malley | .................. C09J 7/38 |
| | | | | 428/41.8 |
| 5,464,692 A | * | 11/1995 | Huber | ...................... C09J 7/245 |
| | | | | 428/343 |

(Continued)

FOREIGN PATENT DOCUMENTS

| CN | 1388199 A | 1/2003 |
| CN | 102399511 A | 4/2012 |

(Continued)

OTHER PUBLICATIONS

Derwent Abstract of JP 2005-187686. See above for date and inventor.*

(Continued)

*Primary Examiner* — Victor S Chang
(74) *Attorney, Agent, or Firm* — Sughrue Mion, PLLC

(57) ABSTRACT

Provided is a masking pressure-sensitive adhesive tape to be used in formation of a metal layer by a vacuum film formation method on part of a surface of an electronic part, which may prevent formation of a metal layer, by the vacuum film formation method, on a surface masked by the masking pressure-sensitive adhesive tape. The masking pressure-sensitive adhesive tape includes: a base material; and a pressure-sensitive adhesive layer arranged on one side of the base material, in which the pressure-sensitive adhesive layer has a thickness of 5 µm or more, and the masking pressure-sensitive adhesive tape has a 180° peeling adhesive strength at 23° C. with respect to a stainless-steel plate of 0.4 N/20 mm or more.

3 Claims, 1 Drawing Sheet

(51) Int. Cl.
  *C09J 7/38* (2018.01)
  *C09D 183/08* (2006.01)
  *C09J 133/08* (2006.01)
  *C09J 183/04* (2006.01)
  *C08G 77/28* (2006.01)

(52) U.S. Cl.
  CPC .... *C09J 2201/122* (2013.01); *C09J 2203/326* (2013.01); *C09J 2433/00* (2013.01); *C09J 2483/00* (2013.01)

(56) References Cited

U.S. PATENT DOCUMENTS

| | | | |
|---|---|---|---|
| 6,815,076 | B2 | 11/2004 | Aoki |
| 7,371,460 | B2 | 5/2008 | Okochi et al. |
| 2003/0017331 | A1 | 1/2003 | Okochi et al. |
| 2003/0091837 | A1 | 5/2003 | Aoki |
| 2009/0163626 | A1* | 6/2009 | Ukei ............... B32B 27/06 524/99 |
| 2011/0209994 | A1* | 9/2011 | Hayata ............. C09J 7/381 204/279 |
| 2012/0248634 | A1 | 10/2012 | Mitsukura et al. |
| 2012/0256326 | A1 | 10/2012 | Mitsukura et al. |
| 2012/0263946 | A1 | 10/2012 | Mitsukura et al. |

FOREIGN PATENT DOCUMENTS

| | | | |
|---|---|---|---|
| CN | 102576681 | A | 7/2012 |
| CN | 103305138 | A | 9/2013 |
| JP | 2002-226797 | A | 8/2002 |
| JP | 2003-096429 | A | 4/2003 |
| JP | 2004-014930 | A | 1/2004 |
| JP | 2004-155853 | A | 6/2004 |
| JP | 2005187686 | A * | 7/2005 |
| JP | 2007-224188 | A | 9/2007 |
| JP | 2009-167271 | A | 7/2009 |
| JP | 2010-121066 | A | 6/2010 |
| JP | 2013-084873 | A | 5/2013 |
| JP | 2014-047310 | A | 3/2014 |
| JP | 2014-101441 | A | 6/2014 |
| JP | 2014-183180 | A | 9/2014 |
| WO | 2012/108217 | A1 | 8/2012 |

OTHER PUBLICATIONS

Translation of JP 2014-183180A. See IDS filed May 5, 2016 for date and inventor.*
Notification of Reason for Refusal dated Mar. 19, 2019 issued by the Japanese Patent Office in counterpart application No. 2015-112963.
Notification of First Office Action dated Dec. 2, 2019, from the China National Intellectual Property Administration in Application No. 201610387504.2.
Second Office Action dated Jul. 24, 2020 by The State Intellectual Property Office of People's Republic of China in Chinese Application No. 201610387504.2.

* cited by examiner

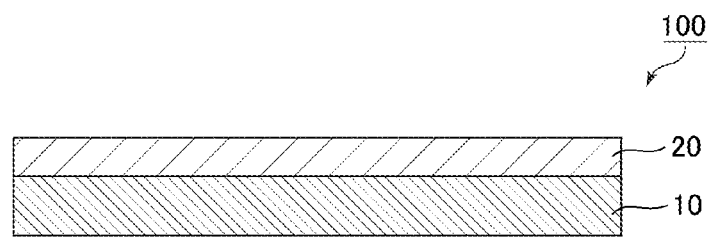

MASKING PRESSURE-SENSITIVE ADHESIVE TAPE

This application claims priority under 35 U.S.C. Section 119 to Japanese Patent Application No. 2015-112963 filed on Jun. 3, 2015, which is herein incorporated by reference.

BACKGROUND OF THE INVENTION

1. Field of the Invention

The present invention relates to a masking pressure-sensitive adhesive tape, and more specifically, to a masking pressure-sensitive adhesive tape to be used in formation of a metal layer by a vacuum film formation method on part of a surface of an electronic part.

2. Description of the Related Art

Heretofore, in an electronic part, an electromagnetic wave shield has been provided to prevent a malfunction of the electronic part due to electromagnetic waves entering from the outside or leakage of electromagnetic waves generated from the electronic part. In recent years, from the viewpoint of reducing sizes of the electronic part, the electromagnetic wave shield has been formed directly on the electronic part by, for example, sputtering or plating (for example, Japanese Patent Application Laid-open No. 2014-183180). In this case, a masking pressure-sensitive adhesive tape is bonded onto a surface, on which formation of the electromagnetic wave shield is not required, for example, to a surface on which an electrode is formed.

In view of improving production efficiency, the electromagnetic wave shield is preferably formed by sputtering. However, when processing under vacuum such as sputtering is carried out, a problem occurs in that a material for shielding the electromagnetic wave enters between the masking pressure-sensitive adhesive tape and the electronic part. In particular, when the uneven surface of an electronic part having an uneven surface (for example, an electronic part including a terminal for bump formation) is masked, the air present in a concave part is liable to leak from the space between the masking pressure-sensitive adhesive tape and the electronic part. As a result, a problem remarkably occurs in that a space is left between the masking pressure-sensitive adhesive tape and the electronic part, and the material for shielding the electromagnetic wave enters thereinto.

SUMMARY OF THE INVENTION

The present invention has been made to solve the related-art problem, and an object of the present invention is to provide a masking pressure-sensitive adhesive tape to be used in formation of a metal layer by a vacuum film formation method on part of a surface of an electronic part, the masking pressure-sensitive adhesive tape being capable of preventing formation of a metal layer by the vacuum film formation method on a surface masked by the masking pressure-sensitive adhesive tape.

A masking pressure-sensitive adhesive tape according to one embodiment of the present invention is a masking pressure-sensitive adhesive tape to be used in formation of a metal layer by a vacuum film formation method on part of a surface of an electronic part, the masking pressure-sensitive adhesive tape including: a base material; and a pressure-sensitive adhesive layer arranged on one side of the base material, in which the pressure-sensitive adhesive layer has a thickness of 5 μm or more, and in which the masking pressure-sensitive adhesive tape has a 180° peeling adhesive strength at 23° C. with respect to a stainless-steel plate of 0.4 N/20 mm or more.

In one embodiment, the electronic part has an uneven surface, and the masking pressure-sensitive adhesive tape is used by being bonded onto the uneven surface.

In one embodiment, the masking pressure-sensitive adhesive tape has a 180° peeling adhesive strength at 23° C. with respect to a stainless-steel plate of 10 N/20 mm or less after the masking pressure-sensitive adhesive tape is bonded onto the stainless-steel plate and left to stand at 200° C. for 1 hour.

According to another embodiment of the present invention, there is provided a method of producing an electronic part. The method of producing an electronic part includes using the masking pressure-sensitive adhesive tape.

According to the present invention, it is possible to provide the pressure-sensitive adhesive tape suited for masking in formation of a metal layer by a vacuum film formation method on part of a surface of an electronic part by arranging the pressure-sensitive adhesive layer having a specific thickness and setting the 180° peeling adhesive strength at 23° C. with respect to a stainless-steel plate to 0.4 N/20 mm or more. When the masking pressure-sensitive adhesive tape of the present invention is used, unnecessary formation of a metal layer by the vacuum film formation method on a surface masked by the masking pressure-sensitive adhesive tape can be prevented.

BRIEF DESCRIPTION OF THE DRAWING

FIG. 1 is a schematic sectional view of a masking pressure-sensitive adhesive tape according to one embodiment of the present invention.

DETAILED DESCRIPTION OF THE PREFERRED EMBODIMENTS

A. Entire Construction of Masking Pressure-Sensitive Adhesive Tape

FIG. 1 is a schematic sectional view of a masking pressure-sensitive adhesive tape according to one embodiment of the present invention. A pressure-sensitive adhesive tape 100 for masking includes a base material 10 and a pressure-sensitive adhesive layer 20 arranged on one side of the base material 10. Although not shown, the pressure-sensitive adhesive tape of the present invention may include a release liner on the outer side of the pressure-sensitive adhesive layer until being used, for the purpose of protecting its pressure-sensitive adhesive surface. The masking pressure-sensitive adhesive tape is hereinafter sometimes simply referred to as "pressure-sensitive adhesive tape."

The 180° peeling adhesive strength at 23° C. of the masking pressure-sensitive adhesive tape of the present invention bonded onto a stainless-steel plate is preferably 0.4 N/20 mm or more, more preferably 0.5 N/20 mm or more. When the 180° peeling adhesive strength falls within such range, a pressure-sensitive adhesive tape suited for masking an electronic part can be obtained. More specifically, a pressure-sensitive adhesive tape that is less liable to be peeled off even in an environment in which the pressure is reduced after the pressure-sensitive adhesive tape is bonded can be obtained. The masking pressure-sensitive adhesive tape of the present invention is less liable to be peeled off even when bonded onto an uneven surface of an electronic part (for example, a surface having a concave part for bump formation). The upper limit of the 180° peeling adhesive strength at 23° C. of the masking pressure-sensitive adhesive tape bonded onto a stainless-steel plate is, for example, 6 N/20 mm. The 180° peeling adhesive strength is measured in conformity with JIS Z 0237: 2000. Specifically, the 180° peeling adhesive strength is measured by: bonding a pressure-sensitive adhesive tape to a stainless-steel plate (arithmetic average surface roughness Ra: 50±25 nm) by turning a 2 kg roller one round; leaving the plate to stand at 23° C. for 30 minutes; and then peeling off the pressure-sensitive adhesive tape under the conditions of a peel angle of 180° and a peel rate (tension rate) of 300 mm/min.

In one embodiment, as described later, the pressure-sensitive adhesive layer is formed of an acrylic pressure-sensitive adhesive. In this embodiment, the 180° peeling adhesive strength at 23° C. of the masking pressure-sensitive adhesive tape bonded onto a stainless-steel plate is particularly preferably from 0.5 N/20 mm to 2.5 N/20 mm. In another embodiment, as described later, the pressure-sensitive adhesive layer is formed of a silicone-based pressure-sensitive adhesive. In this embodiment, the 180° peeling adhesive strength at 23° C. of the masking pressure-sensitive adhesive tape bonded onto a stainless-steel plate is particularly preferably from 0.4 N/20 mm to 5 N/20 mm.

The masking pressure-sensitive adhesive tape of the present invention having such adhesive strength as described above can suitably be used for masking a surface on which formation of a metal layer is not required (for example, a surface on which an electrode is formed) in a step of forming a metal layer by a vacuum film formation method on part of a surface of an electronic part. As described above, the masking pressure-sensitive adhesive tape of the present invention is less liable to be peeled off even under reduced-pressure treatment and does not form a space on a surface to be bonded. Accordingly, when the masking pressure-sensitive adhesive tape of the present invention is used, formation of a metal layer by a vacuum film formation method can be prevented on a surface masked by the masking pressure-sensitive adhesive tape (hereinafter sometimes referred to as "surface to be masked"), that is, a surface on which formation of a metal layer is not required. Examples of the vacuum film formation method include a sputtering method, a vacuum deposition method, and an ion plating method. Of those, a sputtering method is preferred.

The thickness of the pressure-sensitive adhesive layer is 5 µm or more, preferably 6 µm or more, more preferably from 6 µm to 70 µm, still more preferably from 6 µm to 50 µm. When the thickness falls within such range, it is possible to obtain a pressure-sensitive adhesive tape that has a sufficient stress relaxation effect resulting from the pressure-sensitive adhesive layer at an edge of an electronic part when bonded onto the electronic part and enables digging of the edge of the electronic part into the pressure-sensitive adhesive layer. When such pressure-sensitive adhesive tape is used, formation of a metal layer on the surface to be masked can be prevented in vacuum film forming treatment. Setting the thickness of the pressure-sensitive adhesive layer to 70 µm or less can provide a pressure-sensitive adhesive tape capable of suppressing adhesive residue on an adherend.

The thickness of the base material is preferably from 5 µm to 100 µm, more preferably from 10 µm to 75 µm. When the thickness falls within such range, a masking pressure-sensitive adhesive tape excellent in handling can be obtained.

The masking pressure-sensitive adhesive tape of the present invention has a 180° peeling adhesive strength at 23° C. with respect to a stainless-steel plate of preferably 10 N/20 mm or less, more preferably 8 N/20 mm or less, still more preferably from 1 N/20 mm to 8 N/20 mm after the masking pressure-sensitive adhesive tape is bonded onto the stainless-steel plate and left to stand at 200° C. for 1 hour. When the 180° peeling adhesive strength falls within such range, a masking pressure-sensitive adhesive tape that is excellent in peeling property when peeled off from an electronic part and hardly causes adhesive residue after a predetermined step (for example, after vacuum film forming treatment) can be obtained. The adhesive strength is measured after the tape is naturally cooled at ordinary temperature after the standing at 200° C. for 1 hour.

B. Pressure-Sensitive Adhesive Layer

The pressure-sensitive adhesive layer is formed of any appropriate pressure-sensitive adhesive. Examples of the pressure-sensitive adhesive for forming the pressure-sensitive adhesive layer include an acrylic pressure-sensitive adhesive, a silicone-based pressure-sensitive adhesive, a rubber-based pressure-sensitive adhesive, and an epoxy-based pressure-sensitive adhesive. Of those, a silicone-based pressure-sensitive adhesive or an acrylic pressure-sensitive adhesive is preferred from the viewpoint of heat resistance.

The silicone-based pressure-sensitive adhesive contains a silicone-based polymer as a base polymer. An example of the silicone-based polymer is a polymer including dimethylsiloxane as a constitutional unit. In addition, specific examples of the silicone-based pressure-sensitive adhesive include an addition reaction curable silicone-based pressure-sensitive adhesive and a peroxide curable silicone-based pressure-sensitive adhesive. A commercially available product may be used as the pressure-sensitive adhesive. Specific examples of the commercially available product include products manufactured by Dow Corning Toray Co., Ltd. (SD series), products manufactured by Shin-Etsu Silicones (KR-3700 series and X-40 series), and products manufactured by Shin-Etsu Chemical Co., Ltd. (K-100 series).

The acrylic pressure-sensitive adhesive contains an acrylic polymer as a base polymer. Examples of the acrylic polymer include: homopolymers or copolymers of alkyl (meth)acrylates (preferably C1 to C20 alkyl (meth)acrylates), such as methyl (meth)acrylate, ethyl (meth)acrylate, butyl (meth)acrylate, isoamyl (meth)acrylate, n-hexyl (meth)acrylate, 2-ethylhexyl (meth)acrylate, isooctyl (meth) acrylate, isononyl (meth)acrylate, decyl (meth)acrylate, and dodecyl (meth)acrylate; and a copolymer of any of the alkyl (meth)acrylates and any other copolymerizable monomer. Examples of the other copolymerizable monomer include: carboxyl group- or acid anhydride group-containing monomers, such as acrylic acid, methacrylic acid, itaconic acid, fumaric acid, and maleic anhydride; a hydroxyl group-containing monomer, such as 2-hydroxyethyl (meth)acrylate; an amino group-containing monomer, such as morpholyl (meth)acrylate; and an amide group-containing monomer, such as (meth)acrylamide. The content ratio of a constitutional unit derived from the copolymerizable monomer is preferably 20 parts by weight or less, more preferably 15 parts by weight or less, still more preferably from 0.1 part by weight to 10 parts by weight with respect to 100 parts by weight of the base polymer.

The weight-average molecular weight of the acrylic polymer is preferably from 200,000 to 1,500,000, more preferably from 400,000 to 1,400,000. The weight-average molecular weight may be measured by GPC (solvent: THF).

The pressure-sensitive adhesive may further contain any appropriate additive as required. Examples of the additive include a cross-linking agent, a catalyst (for example, a platinum catalyst), a tackifier, a plasticizer, a pigment, a dye, a filler, an anti-aging agent, a conductive material, an ultraviolet absorber, a photostabilizer, a peeling adjusting agent, a softener, a surfactant, a flame retardant, an antioxidant, and a solvent (for example, toluene).

In one embodiment, the pressure-sensitive adhesive further contains a cross-linking agent. Examples of the cross-linking agent include an isocyanate-based cross-linking agent, an epoxy-based cross-linking agent, an aziridine-based cross-linking agent, and a chelate-based cross-linking agent. The content ratio of the cross-linking agent is preferably from 0.1 part by weight to 15 parts by weight, more preferably from 0.5 part by weight to 10 parts by weight with respect to 100 parts by weight of the base polymer contained in the pressure-sensitive adhesive. When the content ratio falls within such range, a pressure-sensitive adhesive tape that has an appropriate adhesive strength, is excellent in pressure-sensitive adhesive property for an uneven surface, and hardly causes adhesive residue when peeled off can be obtained.

The 5% weight loss temperature of the pressure-sensitive adhesive layer is preferably 250° C. or more. When the 5% weight loss temperature falls within such range, a masking pressure-sensitive adhesive tape that is excellent in peeling property and hardly causes adhesive residue when peeled off from an electronic part after a predetermined step (for example, after vacuum film forming treatment) can be obtained. The term "5% weight loss temperature" refers to a temperature at the time when the weight of the pressure-sensitive adhesive layer is reduced by 5% with respect to an initial weight in thermogravimetric (TG) measurement under the following conditions.
(TG Measurement Conditions)
Measurement temperature range: from room temperature to 850° C.
Temperature rising rate: 10° C./min
Atmospheric gas: atmosphere
Gas flow rate: 200 ml/min The storage elastic modulus G' at 25° C. of the pressure-sensitive adhesive layer is preferably from $5\times10^4$ to $5\times10^6$, more preferably from $8\times10^4$ to $9\times10^5$, still more preferably from $1\times10^5$ to $8\times10^5$. When the storage elastic modulus falls within such range, a pressure-sensitive adhesive tape that has an appropriate adhesive strength, is excellent in pressure-sensitive adhesive property for an uneven surface, and hardly causes adhesive residue when peeled off can be obtained. The storage elastic modulus G' is a value determined by preparing the pressure-sensitive adhesive layer in a thickness of from 1.5 mm to 2 mm, punching the pressure-sensitive adhesive layer with a punch having a diameter of 7.9 mm to obtain a sample, and subjecting the sample to measurement with a viscoelastic spectrometer (ARES) manufactured by Rheometric Scientific under the conditions of a chuck pressure of 100 g weight and a frequency of 1 Hz.

C. Base Material

Any appropriate resin is used as a material for forming the base material. Examples of the resin include a polyether sulfone-based resin, a polyether imide-based resin, a polysulfone-based resin, a polyether ether ketone-based resin, a polyarylate-based resin, an aramid-based resin, and a polyimide-based resin. There may also be used a base material formed of a liquid crystal polymer or a base material formed of a metal foil made of aluminum or the like. Of those, a base material formed of a polyimide-based resin is preferably used.

The glass transition temperature of the resin for forming the base material is preferably 300° C. or less, more preferably 260° C. or less. When the glass transition temperature falls within such range, a pressure-sensitive adhesive tape excellent in heat resistance can be obtained. The term "glass transition temperature" refers to a temperature at which the resin shows a peak of a loss tangent (tan δ) found under the conditions of a temperature rising rate of 5° C./min, a sample width of 5 mm, a chuck distance of 20 mm, and a frequency of 10 Hz in a DMA method (tensile method).

D. Method of Producing Masking Pressure-Sensitive Adhesive Tape

The masking pressure-sensitive adhesive tape may be produced by any appropriate method. The masking pressure-sensitive adhesive tape may be obtained by, for example, applying the pressure-sensitive adhesive onto the base material. The following various methods may each be adopted as a method for the application: bar coater coating, air knife coating, gravure coating, gravure reverse coating, reverse roll coating, lip coating, die coating, dip coating, offset printing, flexographic printing, screen printing, and the like. For example, a method involving separately forming the pressure-sensitive adhesive layer on a release liner and bonding the resultant to the base material may also be adopted.

In one embodiment, the pressure-sensitive adhesive layer may be formed through any appropriate curing treatment. In this embodiment, the pressure-sensitive adhesive layer is formed by, for example, applying a pressure-sensitive adhesive composition containing the base polymer and the cross-linking agent described in the section B onto the base material and then heating the pressure-sensitive adhesive composition. The pressure-sensitive adhesive composition may further contain another additive depending on the kind of the pressure-sensitive adhesive to be used. For example, when an addition reaction curable silicone-based pressure-sensitive adhesive is used, the pressure-sensitive adhesive composition may further contain a platinum catalyst.

E. Method of Producing Electronic Part

According to another aspect of the present invention, there is provided a method of producing an electronic part including using a masking pressure-sensitive adhesive tape. The method of producing an electronic part includes, for example, bonding a masking pressure-sensitive adhesive tape to one surface of an electronic part and forming a metal layer by a vacuum film formation method on the surface of the electronic part other than the surface to which the masking pressure-sensitive adhesive tape has been bonded.

Examples of the electronic part include electronic parts susceptible to electromagnetic waves, such as a NAND flash memory, a power amplifier, and a Bluetooth (trademark) module.

The surface to be masked of the electronic part is, for example, an electrode surface of the electronic part. In one embodiment, an electrode for bump formation is formed on the surface to be masked of the electronic part. The part of the electrode for bump formation has a concave shape to facilitate bump formation. The depth of the concave shape is, for example, from 10 μm to 20 μm. In addition, the diameter of the concave shape is, for example, from 5 mm to 7 mm. The masking pressure-sensitive adhesive tape of the present invention is excellent in pressure-sensitive adhesive property even for such uneven surface.

As a method of bonding the masking pressure-sensitive adhesive tape, any appropriate method may be adopted. In one embodiment, the masking pressure-sensitive adhesive tape is bonded onto the electronic part by arranging the masking pressure-sensitive adhesive tape at a predetermined distance from the surface to be masked and then performing reduced-pressure treatment (so-called vacuum bonding). When the pressure-sensitive adhesive tape is bonded onto a surface to be masked that has an uneven surface by such method, a space between the pressure-sensitive adhesive tape and the electronic part can be reduced.

After bonding the masking pressure-sensitive adhesive tape, a metal layer is formed by a vacuum film formation method on a surface other than the surface to which the masking pressure-sensitive adhesive tape has been bonded. Examples of the vacuum film formation method include a sputtering method, a vacuum deposition method, and an ion plating method. Of those, a sputtering method is preferred. In the present invention, even when a space is formed between the masking pressure-sensitive adhesive tape and the surface to be masked to expand the space during reduced-pressure treatment, for example, even when the surface to be masked is an uneven surface, the masking pressure-sensitive adhesive tape is less liable to be peeled off from the surface to be masked, with the result that unnecessary formation of a metal layer on the surface to be masked can be prevented.

In one embodiment, the metal layer is a layer capable of serving as an electromagnetic wave shield.

EXAMPLES

The present invention is hereinafter specifically described by way of Examples. However, the present invention is not limited by these Examples. In addition, the terms "part(s)" and "%" in Examples refer to "part(s) by weight" and "wt %", respectively, unless otherwise stated.

Production Example 1

Preparation of Pressure-Sensitive Adhesive A

100 Parts by weight of butyl acrylate, 10 parts by weight of acrylic acid, and 1 part by weight of an epoxy-based cross-linking agent (manufactured by Mitsubishi Gas Chemical Company, Inc., trade name "Tetrad-C") were mixed to prepare a pressure-sensitive adhesive A.

Production Example 2

Preparation of Pressure-Sensitive Adhesive B

100 Parts by weight of butyl acrylate, 10 parts by weight of acrylic acid, and 0.5 part by weight of an epoxy-based cross-linking agent (manufactured by Mitsubishi Gas Chemical Company, Inc., trade name "Tetrad-C") were mixed to prepare a pressure-sensitive adhesive B.

Production Example 3

Preparation of Pressure-Sensitive Adhesive C

65 Parts by weight of a silicone-based pressure-sensitive adhesive (manufactured by Shin-Etsu Silicones, trade name "KR-3704"), 35 parts by weight of a silicone-based pressure-sensitive adhesive (manufactured by Shin-Etsu Silicones, trade name "KRX-40-3237-1"), 1.5 parts by weight of a platinum catalyst, and 200 parts by weight of toluene were mixed to prepare a pressure-sensitive adhesive C.

Production Example 4

Preparation of Pressure-Sensitive Adhesive D

13 Parts by weight of a silicone-based pressure-sensitive adhesive (manufactured by Shin-Etsu Silicones, trade name "KR-3704"), 87 parts by weight of a silicone-based pressure-sensitive adhesive (manufactured by Shin-Etsu Silicones, trade name "KRX-40-3237-1"), 1.5 parts by weight of a platinum catalyst, and 200 parts by weight of toluene were mixed to prepare a pressure-sensitive adhesive D.

Example 1

Production of Masking Pressure-Sensitive Adhesive Tape

The pressure-sensitive adhesive A prepared in Production Example 1 was applied onto a polyimide film (manufactured by Du Pont-Toray Co., Ltd., trade name "Kapton 100H", thickness: 25 µm) serving as a base material to form a pressure-sensitive adhesive layer having a thickness of 7 µm. Thus, a masking pressure-sensitive adhesive tape was obtained.

Example 2

Production of Masking Pressure-Sensitive Adhesive Tape

A masking pressure-sensitive adhesive tape was obtained in the same manner as in Example 1 except that the thickness of the pressure-sensitive adhesive layer was changed to 10 µm.

Example 3

Production of Masking Pressure-Sensitive Adhesive Tape

A masking pressure-sensitive adhesive tape was obtained in the same manner as in Example 1 except that the thickness of the pressure-sensitive adhesive layer was changed to 50 µm.

Example 4

Production of Masking Pressure-Sensitive Adhesive Tape

The pressure-sensitive adhesive B prepared in Production Example 2 was applied onto a polyimide film (manufactured by Du Pont-Toray Co., Ltd., trade name "Kapton 100H", thickness: 25 µm) serving as a base material to form a pressure-sensitive adhesive layer having a thickness of 5 µm. Thus, a masking pressure-sensitive adhesive tape was obtained.

Example 5

Production of Masking Pressure-Sensitive Adhesive Tape

A masking pressure-sensitive adhesive tape was obtained in the same manner as in Example 4 except that the thickness of the pressure-sensitive adhesive layer was changed to 10 µm.

Example 6

Production of Masking Pressure-Sensitive Adhesive Tape

A masking pressure-sensitive adhesive tape was obtained in the same manner as in Example 4 except that the thickness of the pressure-sensitive adhesive layer was changed to 50 µm.

Example 7

Production of Masking Pressure-Sensitive Adhesive Tape

The pressure-sensitive adhesive C prepared in Production Example 3 was applied onto a polyimide film (manufactured by Du Pont-Toray Co., Ltd., trade name "Kapton 100H", thickness: 25 µm) serving as a base material. After that, curing treatment was performed at 120° C. for 3 minutes to form a pressure-sensitive adhesive layer having a thickness of 8 µm. Thus, a masking pressure-sensitive adhesive tape was obtained.

Example 8

Production of Masking Pressure-Sensitive Adhesive Tape

A masking pressure-sensitive adhesive tape was obtained in the same manner as in Example 7 except that the thickness of the pressure-sensitive adhesive layer was changed to 10 µm.

Example 9

Production of Masking Pressure-Sensitive Adhesive Tape

A masking pressure-sensitive adhesive tape was obtained in the same manner as in Example 7 except that the thickness of the pressure-sensitive adhesive layer was changed to 50 µm.

Example 10

Production of Masking Pressure-Sensitive Adhesive Tape

The pressure-sensitive adhesive D prepared in Production Example 4 was applied onto a polyimide film (manufactured by Du Pont-Toray Co., Ltd., trade name "Kapton 100H", thickness: 25 µm) serving as a base material. After that, curing treatment was performed at 120° C. for 3 minutes to form a pressure-sensitive adhesive layer having a thickness of 5 µm. Thus, a masking pressure-sensitive adhesive tape was obtained.

Example 11

Production of Masking Pressure-Sensitive Adhesive Tape

A masking pressure-sensitive adhesive tape was obtained in the same manner as in Example 10 except that the thickness of the pressure-sensitive adhesive layer was changed to 10 µm.

Example 12

Production of Masking Pressure-Sensitive Adhesive Tape

A masking pressure-sensitive adhesive tape was obtained in the same manner as in Example 10 except that the thickness of the pressure-sensitive adhesive layer was changed to 50 µm.

Comparative Example 1

Production of Masking Pressure-Sensitive Adhesive Tape

A masking pressure-sensitive adhesive tape was obtained in the same manner as in Example 1 except that the thickness of the pressure-sensitive adhesive layer was changed to 4 µm.

Comparative Example 2

Production of Masking Pressure-Sensitive Adhesive Tape

A masking pressure-sensitive adhesive tape was obtained in the same manner as in Example 7 except that the thickness of the pressure-sensitive adhesive layer was changed to 4 µm.

<Evaluation>

The pressure-sensitive adhesive tapes for masking obtained in Examples and Comparative Examples were subjected to the following evaluations. The results are shown in Table 1.

(1) Measurement of Adhesive Strength

The adhesive strength of each of the resultant pressure-sensitive adhesive tapes for masking was measured in conformity to JIS Z 0237: 2000. Specifically, the pressure-sensitive adhesive tape was bonded onto a stainless-steel plate (arithmetic average surface roughness Ra: 50±25 nm) by turning a 2 kg roller one round, left to stand at 23° C. for 30 minutes, and then peeled off under the conditions of a peel angle of 180° and a peel rate (tension rate) of 300 mm/min to measure the adhesive strength of the masking pressure-sensitive adhesive tape.

(2) Measurement of Adhesive Strength after Heat Treatment

Each of the resultant pressure-sensitive adhesive tapes for masking was bonded onto a stainless-steel plate (arithmetic average surface roughness Ra: 50±25 nm) and left to stand in an environment of 200° C. for 1 hour. After that, the stainless-steel plate including the pressure-sensitive adhesive tape was naturally cooled at ordinary temperature, and the adhesive strength of the masking pressure-sensitive adhesive tape after the heat treatment was measured by the same method as that described in the item (1).

(3) Evaluation by Sputtering

As electronic parts, 100 NAND flash memories each having a size of length 12 mm×width 17 mm×thickness 0.5 mm and each having, on one side, a plurality of concave parts (electrodes for bump formation) each having a depth of 20 μm and a diameter of 7 mm were prepared.

Each of the resultant pressure-sensitive adhesive tapes for masking was attached to an 8-inch ring frame, and the electrode surfaces (the surfaces having the concave parts) of the electronic parts were bonded onto the pressure-sensitive adhesive layer surface of the pressure-sensitive adhesive tape by vacuum bonding. 50 of the electronic parts were bonded onto one 8-inch ring frame to prepare a measurement sample, and two such measurement samples (two measurement samples each having the 50 electronic parts mounted thereon) were prepared.

The measurement samples were placed in a chamber of a sputtering apparatus, and a thin film (thickness: 6 μm) of a copper-based alloy was formed. Further, a thin film (thickness: 1 μm) of a nickel-based alloy was formed on the thin film of the copper-based alloy. During sputtering, the vacuum degree in the chamber was set to $10^{-5}$ Pa or less, and then argon gas was supplied to maintain a vacuum degree of 2 Pa.

After that, the electronic parts were peeled off from the masking pressure-sensitive adhesive tape, and the surfaces to be masked were observed by a light microscope (100 times magnification) to confirm the presence or absence of a metal thin film formed by entering into the surfaces to be masked. A sample in which entering of the metal thin film into the concave parts (electrodes for bump formation) was not observed was evaluated as an acceptable product, and a sample in which entering of the metal thin film into one or more concave parts (electrodes for bump formation) was observed was evaluated as a rejected product. In Table 1, the numbers of acceptable products with respect to 100 electronic parts are shown.

TABLE 1

| | Pressure-sensitive adhesive | Thickness of pressure-sensitive adhesive layer (μm) | Adhesive strength (N/20 mm) | Adhesive strength after heat treatment (N/20 mm) | Evaluation by sputtering |
|---|---|---|---|---|---|
| Example 1 | Pressure-sensitive adhesive A | 7 | 0.41 | 1.55 | 100 |
| Example 2 | | 10 | 0.45 | 1.75 | 100 |
| Example 3 | | 50 | 0.8 | 2.3 | 100 |
| Example 4 | Pressure-sensitive adhesive B | 5 | 0.88 | 3.2 | 100 |
| Example 5 | | 10 | 1.1 | 4.4 | 100 |
| Example 6 | | 50 | 1.95 | 5.4 | 100 |
| Example 7 | Pressure-sensitive adhesive C | 8 | 0.42 | 1.65 | 100 |
| Example 8 | | 10 | 0.45 | 1.7 | 100 |
| Example 9 | | 50 | 0.85 | 2.9 | 100 |

TABLE 1-continued

| | Pressure-sensitive adhesive | Thickness of pressure-sensitive adhesive layer (μm) | Adhesive strength (N/20 mm) | Adhesive strength after heat treatment (N/20 mm) | Evaluation by sputtering |
|---|---|---|---|---|---|
| Example 10 | Pressure-sensitive adhesive D | 5 | 2.4 | 3.6 | 100 |
| Example 11 | | 10 | 3.2 | 5.1 | 100 |
| Example 12 | | 50 | 5 | 8.5 | 100 |
| Comparative Example 1 | Pressure-sensitive adhesive A | 4 | 0.31 | 1.3 | 87 |
| Comparative Example 2 | Pressure-sensitive adhesive C | 4 | 0.25 | 1.3 | 90 |

The masking pressure-sensitive adhesive tape of the present invention can be suitably used in formation of a metal layer by a vacuum film formation method on part of a surface of an electronic part as a masking pressure-sensitive adhesive tape a surface on which formation of the metal layer is not required.

What is claimed is:

1. A masking pressure-sensitive adhesive tape to be used in formation of a metal layer by a vacuum film formation method on part of a surface of an electronic part,
   the masking pressure-sensitive adhesive tape comprising:
   a base material; and
   a pressure-sensitive adhesive layer arranged on one side of the base material,
   wherein the pressure-sensitive adhesive layer is formed of a silicone-based pressure-sensitive adhesive,
   the pressure-sensitive adhesive layer has a thickness of 5 μm or more,
   wherein the masking pressure-sensitive adhesive tape has a 180° peeling adhesive strength at 23° C. with respect to a stainless-steel plate of 2.4 N/20 mm or more, and
   wherein the masking pressure-sensitive adhesive tape has a 180° peeling adhesive strength at 23° C. with respect to a stainless-steel plate of 5.1 N/20 mm or less after the masking pressure-sensitive adhesive tape is bonded onto the stainless-steel plate and left to stand at 200° C. for 1 hour.

2. The masking pressure-sensitive adhesive tape according to claim 1, wherein the electronic part has an uneven surface, and the masking pressure-sensitive adhesive tape is used by being bonded onto the uneven surface.

3. The masking pressure-sensitive adhesive tape according to claim 1, wherein the masking pressure-sensitive adhesive tape has a 180° peeling adhesive strength at 23° C. with respect to a stainless-steel plate of 2.4 N/20 mm to 5 N/20 mm.

* * * * *